United States Patent [19]

Rubenstein

[11] 4,189,502
[45] Feb. 19, 1980

[54] MARSHMALLOW VARIEGATE FOR FROZEN CONFECTIONS AND FROZEN CONFECTIONS CONTAINING SAME

[75] Inventor: Irving H. Rubenstein, Owings Mills, Md.

[73] Assignee: Maryland Cup Corporation, Owings Mills, Md.

[21] Appl. No.: 851,761

[22] Filed: Nov. 15, 1977

[51] Int. Cl.$^2$ .................... A23G 9/00; A23G 9/02
[52] U.S. Cl. .................... 426/249; 426/565; 426/571
[58] Field of Search ............... 426/565, 249, 566, 567, 426/571, 576, 658

[56] References Cited

U.S. PATENT DOCUMENTS

| | | | |
|---|---|---|---|
| 1,949,772 | 3/1934 | Allen | 426/249 |
| 3,525,624 | 8/1970 | Rubenstein | 426/567 |
| 3,582,350 | 6/1971 | Werbin | 426/565 |
| 3,671,268 | 6/1972 | Blake et al. | 426/567 |
| 3,682,659 | 8/1972 | Jurczak et al. | 426/571 X |

Primary Examiner—Jeanette M. Hunter
Attorney, Agent, or Firm—Birch, Stewart, Kolasch and Birch

[57] ABSTRACT

Marshmallow variegate which is readily combinable with ice cream and other frozen desserts and which maintains a sharp line of demarcation between the frozen dessert matrix and the variegate. The variegate composition comprises about 40 to 50% by weight of sugar solids, about 1 to 3% by weight of a stretch-providing component characteristic of marshmallow, such as pre-gelatinized starch, about 0.2 to 0.8% by weight of an emulsifier having an HLB number of from 3 to 9, about 0.2 to 0.5% by weight of a stabilizer such as an edible gum or gelatin, and the balance being water and flavoring.

16 Claims, No Drawings

MARSHMALLOW VARIEGATE FOR FROZEN CONFECTIONS AND FROZEN CONFECTIONS CONTAINING SAME

FIELD OF THE INVENTION

This invention is directed to marshmallow and variegating syrups for ice cream and other frozen desserts which maintain a sharp demarcation in those desserts for enhancement of flavor, variety, and eye appeal.

BACKGROUND OF THE INVENTION

For many years, marshmallow flavored variegating syrups have been combined with ice cream, ice milk, mellorine and other frozen desserts for the purpose of adding flavor, variety, and eye appeal to these confections. These ingredients or confectionary additives of marshmallow and similar whipped variegating materials have often been purchased in a prewhipped or complete state, and have been added to the ice cream or frozen confection either by simultaneously pumping the variegate and the frozen confection through a common line or extrusion nozzle into the final container, or by placing the marshmallow or similar material on the top or bottom of the frozen confection by means of special filling attachments designed for this purpose. Alternatively, whipped marshmallow or variegate has been blended with frozen confection prepared separately and frozen together with the incorporation of air in an ice cream freezer such as those continuous ice cream freezers readily available on the market and sold by Creamery Package Company (Crepaco) or Cherry-Burrell Corporation.

A great difficulty is incurred in the incorporation of certain variegates with certain types of frozen confections with the variegate losing its character and blending improperly with the remainder of the frozen confection. Pre-whipped marshmallow, for example, contains about 80% sugar solids in contrast to about 40% sugar solids for the ice cream or other frozen dessert with which it is blended. As a result there is a differential of freezing and melting points so that the consumer often ends up with the marshmallow melting and sinking to the bottom of the finished packages even when the confection is stored at conventional temperatures used for ice cream. In addition, pre-whipped marshmallow is bulky and difficult to handle besides costing substantially more than the basic ice cream it is meant to flavor.

A blend of egg whites, water, sugars, gums and appropriate flavors can be blended in a tank and frozen in an ice cream freezer to make a marshmallow-like substance. The problem is the lack of the characteristic "stretch" of marshmallow and the difficulty of getting the ingredients into solutions in the type of tanks with slow agitation such as those found in most ice cream and/or frozen dessert plants.

The prior art teachings such as those in U.S. Pat. Nos. 3,525,624 and 3,582,350 of Irving Rubenstein illustrate techniques that can be applied to the incorporation of variegates into frozen desserts. These patents describe a technology for substituting modified soya protein for the more conventional egg whites either partially or completely when a frozen dessert or dessert additive is to be made in an ice cream freezer. If the examples described in these patents have the total sugar solids increased to about 50%, then this modification would result in a marshmallow-type product.

The egg white method and the soya protein method are workable ones but must be carefully supervised since the marshmallow-type variegate mix resulting therefrom is not compatible with fat so that contamination with even a small amount of ice cream mix, fat or emulsifier containing product will inhibit the resulting whip. In addition, the marshmallow emitted from a freezer from this process is quite soft so that it is difficult to maintain a sharp line of delineation or demarcation between the marshmallow and the basic matrix of ice cream or other frozen dessert.

It is therefore an object of the present invention to provide a new and novel formulation for marshmallow and other whipped variegates which are readily combinable with ice cream and other frozen desserts and which maintain a sharp line of delineation or demarcation between the frozen dessert matrix and the variegate.

SUMMARY OF THE INVENTION

The present invention provides a marshmallow product and other variegates in which an emulsifier provides the whip, and wherein the stretch normally associated with marshmallow and other whipped marshmallow-like products or variegates is provided by certain materials, preferably pre-gelatinized starch. Additionally, a stabilizer such as a gum is generally preferred in such a mixture and such gums as carboxymethylcellulose, locust bean gum, guar gum, sodium alginate, gelatin or similar acceptable colloids are utilized to improve the body and stiffness of the finished marshmallow product. The emulsifiers are chosen with an HLB number (Hydrophile-Lipophile balance) in the range of 3 to 9. The range of the emulsifier is 0.2 to 0.8% by weight of the marshmallow or variegate mix while from about 1 to 3%, preferably 2 to 2.5% by weight of pre-gelatinized starch is employed in the formulations of the invention.

Materials other than starch can be employed to provide the stretch component characteristic of marshmallow in the present invention. For example, about 0.5 to 1%, preferably 0.7%, by weight of sodium alginate or about 0.2 to 0.4%, preferably 0.3%, by weight of carrageenan can be substituted for part or all of the starch. Other suitable substitutes for the starch include about 0.5 to 1% by weight of pectins or about 0.75 to 1.5%, preferably 1%, by weight of the product known as Avicel (micro-crystalline cellulose).

Where it is desired to make a whipped variegating syrup rather than a marshmallow variegate, that is, where the stretch of the marshmallow is not desired, the amount of pre-gelatinized starch or other stretch component is reduced and the level of gum or stabilizers such as guar gum, gelatin, locust bean gum, carrageenan or the like is increased.

In both applications, the product is characterized by its ability to maintain a clear and distinct line of demarcation or delineation between itself and the frozen dessert matrix into which it is incorporated.

DETAILED DESCRIPTION OF THE INVENTION

In choosing the emulsifier for the compositions of the present invention it has been established that HLB numbers 14 and 15 are too water soluble and will not create foam and that those emulsifiers having an HLB below 3 have too little affinity for water to be useful. Experimental runs have shown that glycerol monostearate will work but has a disadvantage of being difficult to disperse in a sugar solution.

Modified preparations of distilled monoglycerides blended with distilled propylene glycol monoesters are more easily dispersible and when, for example, these are made into an aqueous dispersion with stearyl lactic acid (as is done by Eastman Chemical with some of its emulsifiers), dispersion in the mix is easily accomplished. Another emulsifier that provides workable results is made by P.V.O. International in which glycerol is polymerized to an average of six molecular units and is then esterified with stearic acid. This compound has an HLB number of 4.0 which is on the lyophilic side but the glycol portion of the molecule aids dispersion.

Another useful emulsifier has been found to be sodium stearoyl-2-lactate. This compound has an HLB number of 6.5 which would classify it with the lipophilic emulsifiers. However, since this emulsifier is a product of stearic and lactic acid neutralized to its sodium salt, there is again an affinity for water dispersion, this time possibly due to the sodium anion and the lactic acid portion of the molecule.

It is to be understood that the foregoing emulsifiers are those which have been found to be specifically workable but that other emulsifiers and emulsifier blends such as mixtures of sorbitan stearates and polyoxyethylene sorbitan stearates are not precluded.

It has been found that with any emulsifier it is desirable to have the fatty acid radical derived from a hard fat (e.g., stearate) rather than a soft fat (e.g., oleate), for the soft fat derivatives are not able to hold the foam structure of the finished whip.

The preferred starch should be in a pre-gelatinized state and can be of corn, tapioca or other vegetable origin. This is to avoid the necessity of cooking the starch, but if it is a matter of economy or convenience to use a conventional starch, this can be done if the mixture is heated to an appropriate temperature of at least 180° F. and held at that temperature for 20 minutes.

The formulations of the present invention are designed for ice cream plants and can be handled in conventional ice cream freezer equipment which is available at such plants.

The sugar syrups, or dry sugar and water for making such a syrup are combined in a pasteurizing tank with the emulsifier. The resulting batch is brought to a temperature above the melting point of the emulsifier at which point the starch or starches and gums are added to the mixtures and the entire mass is brought to a pasteurizing temperature of 160° F. or other required health regulation temperature. Where the regulations do not require cooking, some emulsifiers such as Eastman 60-06S can be used in conjunction with starch and carboxymethyl cellulose in an ambient system.

After thorough mixing, the mix can be cooled to 130° F. or to a temperature high enough to maintain a fluid viscosity of the mix, thereby enabling it to be pumped to an ice cream freezer. This temperature range can vary greatly with available equipment. For instance, if the freezer pumps are required to suck the mix from the tanks the temperature will have to be in the range of 120° F., or if booster pumps are provided the temperature can be as low as 100° F.

Where the intention is to make a variegating syrup rather than a marshmallow, in a situation where the stretch characteristic of marshmallow is not desired, it is a simple matter to reduce the amount of pre-gelatinized starch and raise the level of stabilizer gums to achieve a variegating syrup mix as opposed to a marshmallow mix. This will be hereinafter more fully described with regard to specific examples of representative mixes.

After the mix has been completed, the finished mix is frozen in the same manner as ice cream and at comparable temperatures to ice cream so that both materials enter the ultimate package for the frozen confection or ice cream and therefore present similar freezing characteristics to preclude mixing or absorption of the variegate into the ice cream matrix and thereby maintain its variegating characteristic and sharp delineation or demarcation with the ice cream or frozen dessert matrix.

The reference to similar freezing characteristics merely is intended to include, for example, differentials in total solids content on the order of 10% such as 50% for marshmallow and 40% for ice cream. Such differentials bring the two products to be intermingled within the scope of normal operating ranges for ice cream freezers which are commercially available. Of course, if it becomes critical then such freezing conditions and characteristics can be evened out by reducing the total sugars in the marshmallow mix to somewhat below the preferred range to as close to 40% total sugar solids as possible.

Examples of Useable Marshmallow Compositions

Example Number 1

| | |
|---|---|
| Corn syrup (wet basis) | 25% |
| Cane sugar syrup (dry basis) | 25% |
| Emulsifier 6-2-S | 0.8% |
| Pre-gelatinized starch (instant Clearjel manufactured by National Starch Co.) | 2.5% |
| Gelatin | 0.5% |
| Water to make 100% | |

Example Number 2

| | |
|---|---|
| Corn syrup (wet basis) | 25% |
| Cane sugar syrup (dry basis) | 25% |
| Emulsifier (Myvatex 40-06S) (Eastman Chemical) | 0.4% |
| Pre-gelatinized starch (instant Pureflo manufactured by National Starch Co.) | 2.5% |
| Carboxymethylcellulose | 0.2% |
| Water | 46.9% |

Both of the foregoing examples 1 and 2 are for marshmallow products in which the quality of stretch is desired. For variegate syrups where stretch is not a desired characteristic of the formulation, the following examples have been found to be satisfactory:

Example Number 3

| | |
|---|---|
| Emulsifier (sodium stearyl-2-lactate) | 0.4% |
| Corn syrup (wet basis) | 25% |
| Cane sugar (dry basis) | 25% |
| Pre-gelatinized starch(Nu:Col) (A.E. Staley Co.) | 1.0% |
| Gelatin | 0.5% |
| Citric Acid | 0.3% |
| Strawberry (or other fruit flavor) plus water to make 100% | 48% |

Example Number 4

| | |
|---|---|
| Emulsifier(Myvatex-3-50) (Eastman Chemical) | 0.5% |
| Strawberries | 20% |

-continued

| Example Number 4 | |
|---|---|
| Corn syrup (wet basis) | 25% |
| Cane sugar (dry basis) | 17% |
| Pre-gelatinized starch | 1.5% |
| Locust bean gum | 0.2% |
| Citric Acid | 0.3% |
| Water | 35% |

Both of the foregoing examples are illustrative of variegating syrups which are made by the principles of the present invention and which exhibit the characteristics of maintaining their delineation of sharp lines of demarcation between themselves and the frozen dessert matrix into which they are incorporated.

The invention is of further use in the manufacture of whipped frostings and the like in which, for example, 20% of fat is deliberately introduced to give a desired flavor and mouth feel. In such a situation, all of the ingredients can be combined with or without homogenization except in the case of chocolate flavored frostings in which it is desired to either have a cocoa flavor milled into the fat as in conventional coatings for ice cream or candy bars or alternatively, to have the cocoa homogenized into a chocolate syrup prior to mixing with the other ingredients.

A working example of a formulation for such a frosting with a chocolate flavor combined with an ice cream bar coating mix is as follows:

| Emulsifier 6-2-S | 0.6% |
|---|---|
| Ice cream bar coating | 20% |
| Cane syrup (wet basis) | 25% |
| sugar (dry basis) | 10% |
| Pre-gelatinizaed starch | 2.5% |
| Gelatin | 0.5% |
| Cocoa or other flavoring and water | 41.4% |

The foregoing ingredients are whipped by conventional means to provide a whipped frosting having a definite smooth mouth feel with chocolate flavoring in the case of cocoa mixed with the ice cream bar coating or with other flavorings as desired.

As can be seen from the foregoing specification and the examples given, the present invention provides a novel and versatile system of emulsifiers and pre-gelatinized starches to provide the whip and stretch characteristics for variegate compositions such as marshmallow and variegate syrups as well as for whipped coatings and frostings and the like. The resulting products are all compatible with ice cream and other frozen dessert mixes and have been found to be workable in conventional commercially available ice cream freezer equipment of the continuous type such that ice cream confections can be manufactured which include chocolate marshmallow ice cream having a clear and distinct line of demarcation or delineation between the marshmallow swirled in the chocolate ice cream matrix as well as exhibiting similar characteristics for fruit flavored and colored variegating syrups, and the like. Furthermore, this formulation is amenable to the preparation of frosting like coatings that can be readily manufactured with a desired flavor and mouth feel from the same basic ingredients with the percentages of these ingredients being modified basically, by the addition of about 5–40% fat.

The compatibility of the variegating syrups and mixes of the present invention with fat and moisture containing formulations is unique in its exhibition of the characteristics of maintaining a stark and clear delineation between the variegate and the frozen dessert matrix.

It should be understood that the formulations of the present invention may be modified as would occur to one of ordinary skill in the art without departing from the spirit and scope of the present invention.

It is claimed:
1. A marshmallow variegate composition for frozen desserts and the like consisting essentially of:
   a. about 40% to 50% by weight of sugar solids;
   b. about 1 to 3% by weight of a component which provides to the composition the extensibility characteristic of marshmallow;
   c. about 0.2 to 0.8% by weight of an emulsifier having an HLB number of from 3 to 9;
   d. about 0.2 to 0.5% by weight of stabilizers from the group consisting of edible gums and gelatin; and
   e. the balance being water and flavoring.

2. The composition of claim 1, wherein the component which provides the extensibility characteristic of marshmallow to the composition is starch.

3. The composition of claim 2, wherein the starch is pregelatinized.

4. The composition of claim 1, wherein the stabilizer is gelatin.

5. The composition of claim 1, wherein the stabilizer is locust bean gum.

6. The composition of claim 1, wherein the stabilizer is carboxymethylcellulose.

7. A variegated frozen confectionary product comprising a frozen ice cream matrix; and
   the variegate composition of claim 1 swirled into and frozen with said frozen matrix.

8. The composition of claim 1, wherein the amount of emulsifier is about 0.4 to 0.5% by weight.

9. The composition of claim 1, wherein the emulsifier is a stearate or lactate ester.

10. The composition of claim 1, wherein the component having the extensibility characteristic of marshmallow in starch, sodium alginate, carrageenan, pectin or microcrystalline cellulose.

11. A marshmallow variegate composition for incorporation into a frozen confection consisting essentially of:
   a. about 1 to 3% by weight of gelatinized starch;
   b. about 0.2 to 0.8% by weight of an emulsifier from the group having HLB numbers of from 3 to 9;
   c. about 0.2 to 0.5% by weight of a stabilizer selected from the group of edible gums and gelatin; and
   d. the balance being sugar solids, water and flavoring.

12. The composition of claim 11, wherein the starch is pregelatinized.

13. The composition of claim 11, wherein the stabilizer is gelatin.

14. The composition of claim 11, wherein the stabilizer is locust bean gum.

15. The composition of claim 11, wherein the stabilizer is carboxymethylcellulose.

16. A variegated frozen confectionary product comprising a frozen ice cream matrix; and
   the variegate composition of claim 11 swirled into and frozen with said frozen matrix.

* * * * *